United States Patent
Cohen et al.

(10) Patent No.: US 9,014,056 B2
(45) Date of Patent: Apr. 21, 2015

(54) BRIDGING NETWORK DEVICES IN A HYBRID COMMUNICATION NETWORK

(71) Applicant: QUALCOMM Incorporated, San Diego, CA (US)

(72) Inventors: Etan Gur Cohen, San Francisco, CA (US); Sidney B. Schrum, Jr., Ocala, FL (US); Lawrence W. Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 13/718,399

(22) Filed: Dec. 18, 2012

(65) Prior Publication Data

US 2014/0169222 A1    Jun. 19, 2014

(51) Int. Cl.
- H04L 12/28 (2006.01)
- H04W 84/22 (2009.01)
- H04L 12/46 (2006.01)
- H04L 12/751 (2013.01)
- H04L 12/741 (2013.01)

(52) U.S. Cl.
CPC .............. *H04W 84/22* (2013.01); *H04L 12/462* (2013.01); *H04L 45/02* (2013.01); H04L 45/54 (2013.01)

(58) Field of Classification Search
None
See application file for complete search history.

(56) References Cited

U.S. PATENT DOCUMENTS

| | | | |
|---|---|---|---|
| 7,305,474 B2 | 12/2007 | Giaffreda et al. | |
| 7,633,942 B2 | 12/2009 | Bearden et al. | |
| 7,835,372 B2 | 11/2010 | Wang et al. | |
| 2004/0100904 A1 | 5/2004 | Chander et al. | |
| 2007/0038743 A1 | 2/2007 | Hellhake et al. | |
| 2007/0086361 A1* | 4/2007 | Allan et al. | 370/254 |
| 2008/0253566 A1* | 10/2008 | Hidaka | 380/255 |
| 2011/0032936 A1 | 2/2011 | Ashwood-Smith et al. | |
| 2012/0030150 A1* | 2/2012 | McAuley et al. | 706/12 |
| 2012/0127881 A1 | 5/2012 | Wiley et al. | |
| 2012/0230343 A1 | 9/2012 | Schrum, Jr. | |

FOREIGN PATENT DOCUMENTS

WO    2014099337    6/2014

OTHER PUBLICATIONS

IEEE PI905, Draft Standard for a Convergent Digital Home Network for Heterogeneous Technologies, Nov. 10, 2011, 91 Pages.

(Continued)

*Primary Examiner* — David Oveissi
(74) *Attorney, Agent, or Firm* — DeLizio Gilliam, PLLC

(57) ABSTRACT

A hybrid bridge can implement functionality for selectively populating its bridge tables based on preferred transmission routes to influence other network devices to transmit frames based on the preferred transmission routes. The hybrid bridge determines a preferred transmission route for communicating with each network device in the hybrid communication network. For each of the network devices, it is determined whether the hybrid bridge is part of the preferred transmission route associated with the network device. Depending on whether the hybrid bridge is part of the preferred transmission route to the network device and/or whether a network interface of the hybrid bridge is a transmit or a receive interface on the preferred transmission route, a local bridge table or a remote bridge table of the network interface can be populated with at least the address of a destination network device.

21 Claims, 5 Drawing Sheets

(56) References Cited

OTHER PUBLICATIONS

PCT Application No. PCT/US2013/072658 International Search Report, Mar. 31, 2014, 14 pages.

"P1901 TSG2 Draft Annex RB—Inner 1901Routing and Bridging (informative); P1901 TSG2-PM 0183 r02 annexRB", IEEE Draft;P1901 TSG2-PM 0183 R02 ANNEXRB SHMG,IEEE-SA, Piscataway, NJ USA,vol. 1901.TSG2-PM, No. r02, Nov. 10, 2009, pp. 1-25.

* cited by examiner

BRIDGING NETWORK DEVICES IN A HYBRID COMMUNICATION NETWORK

BACKGROUND

Embodiments of the inventive subject matter generally relate to the field of communication networks and, more particularly, to bridging network devices in a hybrid communication network.

Hybrid communication networks typically comprise multiple network devices that implement multiple networking technologies (e.g., wireless local area network (WLAN) technologies, powerline communication technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable network devices that forward frames between the different network technologies and media to form a single, extended communication network. Hybrid communication networks typically present multiple frame delivery routes between any two network devices in the hybrid communication network.

SUMMARY

Various embodiments for bridging network devices in a hybrid communication network are disclosed. In one embodiment, a hybrid network layer of a hybrid bridge device of a hybrid communication network determines a preferred transmission route for communicating with a first of a plurality of network devices of the hybrid communication network based, at least in part, on one or more topology discovery messages received from one or more of the plurality of network devices of the hybrid communication network. The hybrid network layer then determines whether the hybrid bridge device is part of the preferred transmission route associated with the first of the plurality of network devices. A bridge table associated with the hybrid bridge device is populated with an identifier associated with the first of the plurality of network devices based on whether the hybrid bridge device is part of the preferred transmission route associated with the first of the plurality of network devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
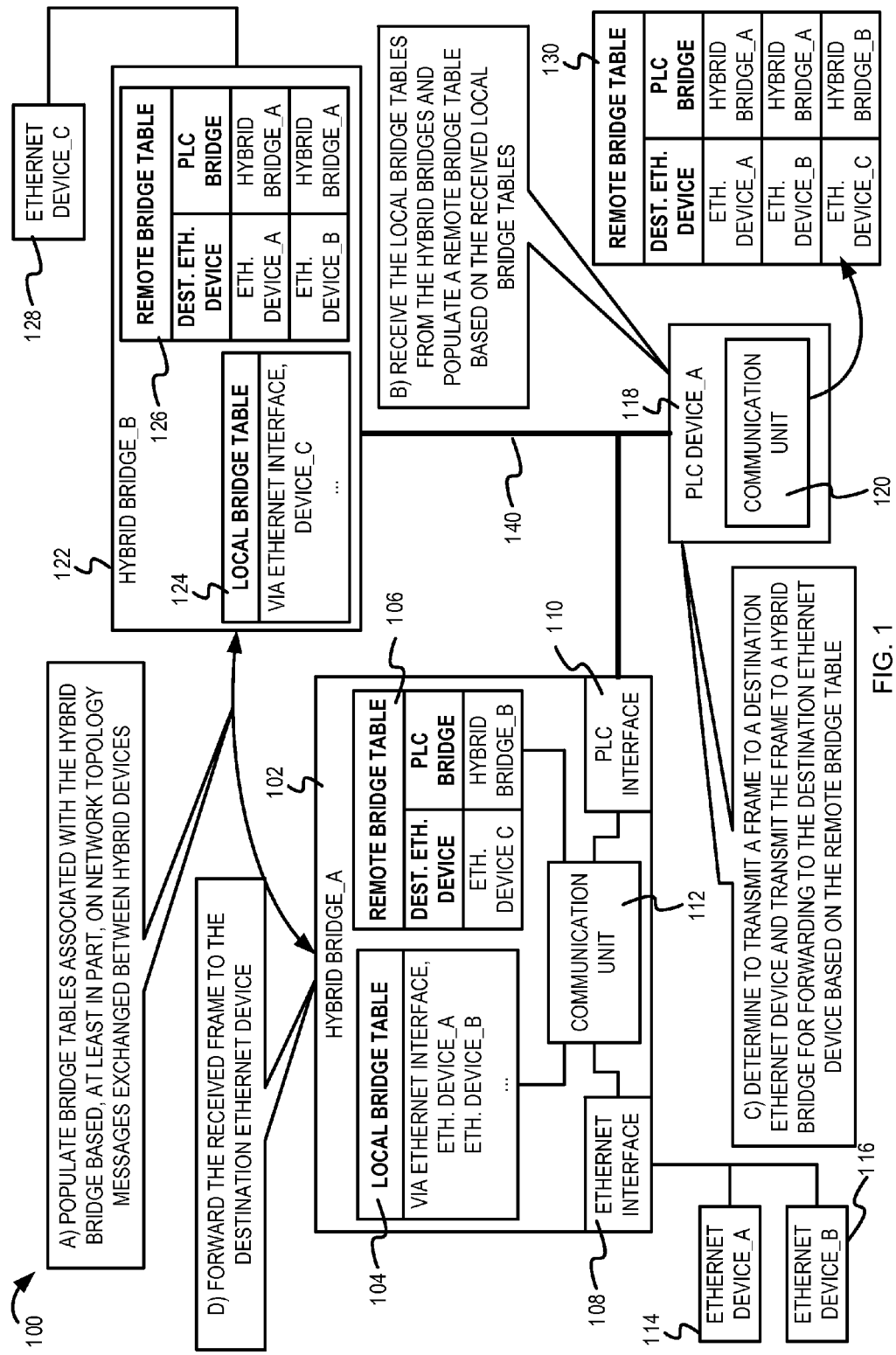
FIG. 1 is a conceptual diagram illustrating an example mechanism for bridging network devices in a hybrid communication network.

The description that follows includes exemplary systems, methods, techniques, instruction sequences, and computer program products that embody techniques of the present inventive subject matter. However, it is understood that the described embodiments may be practiced without these specific details. For instance, although examples refer to operations for bridging Ethernet devices and powerline communication (PLC) devices (e.g., HomePlug® AV devices), embodiments are not so limited. In other embodiments, the bridging operations described herein can be employed to bridge network devices that implement other suitable communication protocols (e.g., for bridging Ethernet devices with Multimedia over Coax Alliance (MoCA®) devices, etc.). In other instances, well-known instruction instances, protocols, structures, and techniques have not been shown in detail in order not to obfuscate the description.

A network interface (e.g., a PLC interface and/or MoCA interface) associated with a network bridge can maintain two types of bridge tables—a local bridge destination address table (LBDAT) and a remote bridged address table (RBAT). The network interface of the network bridge ("network bridge interface") maintains the LBDAT to identify which destination devices are directly reachable via the bridging-capable network bridge interface. Each network interface (e.g. whether or not a bridging-capable network interface) can maintain the RBAT that indicates to which network bridge a frame should be forwarded so that the frame reaches an intended destination device. In accordance with conventional bridging functionality, the network bridge interface can use source address learning to populate its local bridge table (e.g., the LBDAT) and to determine which network devices are reachable via the network bridge interface. In accordance with the conventional bridging functionality, network interfaces associated with other network devices in the communication network can use the local bridge tables (received from the network bridge interface) to populate their respective remote bridge table (e.g., an RBAT). The RBAT can enable the other network interfaces to identify the network bridge interface via which a destination network device is accessible. For example, when a conventional PLC-to-Ethernet bridge receives a frame at its Ethernet interface, it can record the source address of the received frame in its local bridge table (e.g., associated with the PLC interface). If the conventional PLC-to-Ethernet bridge receives (at its PLC interface) a frame intended for an Ethernet device listed in its local bridge table, the conventional PLC-to-Ethernet bridge can forward the received frame to the Ethernet device. However, the hybrid communication network can offer multiple transmission routes between any two network devices. Therefore, conventional bridging functionality is typically not sufficient to properly support bridging in the hybrid communication network. Multiple transmission routes between two network devices can result in communication loops and frame replication. Also, because the conventional bridging functionality uses source address learning to populate the local and remote bridge tables, this can result in unintended discarding of frames, changes in frame transmission routes, use of non-optimal frame transmission routes, and unnecessary flooding of frames in the hybrid communication network.

A hybrid networking sub-layer of a hybrid device configured as a network bridge ("hybrid bridge") can be configured to execute functionality to selectively populate its local bridge table and remote bridge table based on the hybrid networking sub-layer's knowledge of the topology of the hybrid communication network and the preferred transmission routes. A hybrid bridge can determine, based on received topology discovery messages, a preferred transmission route for communicating with each network device of the hybrid communication network via its network interfaces ("hybrid bridge interfaces") that support bridging (or frame forwarding). For each of the network devices, if the hybrid bridge interface (e.g., a HomePlug AV interface) is a receive interface on the preferred transmission route to the network device, the hybrid bridge interface can populate its local bridge table with the address of the network device to indicate that the network device is reachable via the hybrid bridge interface. If the hybrid bridge interface is not part of the preferred transmission route to the network device or if the hybrid bridge interface is a transmit interface on the preferred transmission route to the network device, the hybrid bridge interface can identify another hybrid bridge interface (e.g., of another hybrid bridge) that is a receive interface on the preferred transmission route. The hybrid bridge interface can populate its remote bridge table to indicate that any frame destined for the network device should be forwarded via the other hybrid bridge. Such a hybrid bridging mechanism for bridging devices in a hybrid communication network can help prevent unintended discarding of frames, unintended route changes, communication loops, and frame replication. By configuring the hybrid bridges to selectively populate their local bridge tables and remote bridge tables in accordance with the preferred transmission routes, the hybrid bridging mechanism can influence the content of the remote bridge tables of the legacy devices in the hybrid communication network and can influence the legacy devices to use the preferred transmission routes. Thus, the hybrid bridging mechanism can enable not only the hybrid devices but also the legacy devices to efficiently route frames in the hybrid communication network.

FIG. 1 is a conceptual diagram illustrating an example mechanism for bridging network devices in a hybrid communication network 100. The hybrid communication network 100 comprises hybrid devices 102 and 122, legacy Ethernet devices 114, 116, and 128, and a legacy PLC device 118. In some embodiments, the hybrid devices 102 and 122 can be network devices that comprise multiple network interfaces and that implement a plurality of communication protocols (which may also be referred to as access technologies) to couple the hybrid device to a plurality of heterogeneous communication networks. In another embodiment, the hybrid devices 102 and 122 can be network devices that support hybrid networking topology messages and related functionality (e.g., network devices that comprise a hybrid networking layer). The hybrid device 102 comprises two network interfaces—an Ethernet interface 108 and a PLC interface 110 that couple the hybrid device 102 to an Ethernet and a powerline network 140 respectively. Likewise, the hybrid device 122 comprises at least an Ethernet interface (not shown) and a PLC interface (not shown) that couple the hybrid device 122 to the Ethernet and the powerline network 140 respectively. It is noted that in other embodiments, the hybrid devices 102 and 122 can comprise the same number of network interfaces, different number of network interfaces, same type of network interfaces, or different type of network interfaces. The legacy devices comprise a single interface that couples the legacy device to a corresponding single communication network. In FIG. 1, the legacy Ethernet devices 114, 116, and 128 each comprises a single Ethernet interface that couple the Ethernet devices 114, 116, and 128 to the Ethernet. Likewise, the legacy PLC device 118 comprises a single PLC interface that couples the PLC device 118 to the powerline network 140. In the hybrid communication network 100 of FIG. 1, the Ethernet interface 108 of the hybrid device 102 is coupled to the legacy Ethernet devices 114 and 116. The PLC interface 110 of the hybrid device 102 is coupled to the legacy PLC device 118. The hybrid device 122 is coupled to the legacy Ethernet device 128 (via its Ethernet interface) and to the legacy PLC device 118 (via its PLC interface).

In FIG. 1, the hybrid devices 102 and 122 are each configured as bridging-capable network devices and are herein referred to as "hybrid bridge devices" or "hybrid bridges." In the example of FIG. 1, the hybrid bridges 102 and 122 are PLC-to-Ethernet bridges that forward frames received from PLC devices (via the PLC interface) to Ethernet devices (via the Ethernet interface). If the powerline technology employed in the hybrid communication network 100 is HomePlug® AV, the hybrid devices 102 and 122 can each be HomePlug AV-to-Ethernet bridges. As discussed above, each hybrid bridge 102 and 122 can comprise at least two bridge tables—a local bridge table and a remote bridge table. For example, the local bridge table indicates which Ethernet devices can be accessed from the hybrid bridge via the preferred transmission route, and the remote bridge table indicates how to access those Ethernet devices that cannot be accessed from the hybrid bridge via the preferred transmission route. In FIG. 1, the hybrid bridge 102 comprises a local bridge table 104 and a remote bridge table 106; while the hybrid bridge 122 comprises a local bridge table 124 and a remote bridge table 126. The legacy PLC device (and other legacy devices and hybrid devices that are not configured as bridging-capable devices) typically do not comprise a local bridge table and only comprise a remote bridge table. In FIG. 1, the legacy PLC device 118 comprises a remote bridge table 130. Operations for populating the local bridge tables and the remote bridge tables will further be described below in FIGS. 1-2.

The hybrid bridges 102 and 122 can each be electronic devices configured to implement a plurality of communication protocols or access technologies, such as a laptop computer, a tablet computer, a mobile phone, a smart appliance, a gaming console, an access point, a desktop computer, or other suitable electronic devices. In some implementations, the hybrid bridge 102 also comprises a communication unit 112 configured to implement at least a subset of communication protocols or access technologies in a hybrid communication network. The communication unit 112 can implement functionality described below in FIGS. 1-3 to selectively populate the local bridge table 104 and the remote bridge table 106 according to the preferred transmission route for communicating with the other network devices of the hybrid communication network 100. Although not depicted in FIG. 1, the hybrid bridge 122 may also comprise a communication unit that implements the functionality described below in FIGS. 1-3. In FIG. 1, the legacy PLC device 118 comprises a communication unit 120. The communication unit 120 can execute operations described below in FIGS. 1-3 to populate the remote bridge table 130 and to determine how to route a frame to an Ethernet device. In some embodiments, the communication units of the hybrid bridges 102 and 122 can be implemented as part of the hybrid networking sub-layer of the respective hybrid bridges 102 and 122. In some embodiments, the communication unit of the hybrid bridges 102 and 122 and the legacy PLC device 118 can each be implemented on a system-on-a-chip (SoC), an application specific integrated circuit (ASIC), or another suitable integrated circuit to enable network communications on their respective network device. In some embodiments, the communication units may each comprise one or more processors and memory, and may each be implemented in one or more integrated circuits on one or more circuit boards of their respective network device.

At stage A, the communication unit 112 populates bridge tables associated with the hybrid bridge 102 based, at least in part, on network topology messages exchanged between the hybrid devices 102 and 122 in the hybrid communication network 100. Each of the hybrid devices 102 and 122 in the hybrid communication network 100 typically transmit topology discovery messages that include information about the hybrid device that transmitted the topology discovery message and information about its neighbor (hybrid and legacy) devices. For example, the hybrid bridge 102 may transmit topology discovery messages indicating that it has two network interfaces—the Ethernet interface 108 and the PLC interface 110, that the Ethernet devices 114 and 116 are connected to its Ethernet interface 108, and that the PLC device 118 is connected to its PLC interface 110. The topology discovery message can also comprise a list of the network interfaces through which the hybrid bridge 102 supports frame forwarding. In FIG. 1, the communication unit 112 may indicate that the hybrid bridge 102 supports PLC-to-Ethernet bridging via the PLC (e.g., HomePlug AV) interface 110. In one embodiment, the hybrid bridge 102 can indicate it supports the hybrid bridging functionality through the PLC interface 110 by setting one or more predetermined bits in a management message transmitted from the PLC interface 110 (e.g., by setting a bridging station flag (BSF) in a CM_BRG_INFO.CNF management message for a HomePlug AV interface). However, if the PLC interface 110 of the hybrid device 102 does not support the hybrid bridging functionality, the topology discovery message broadcast by the hybrid device 102 may not include the PLC interface 110 in the list of network interfaces of the hybrid device 102 through which frames can be forwarded. Likewise, the hybrid bridge 122 may transmit topology discovery messages identifying its network interfaces (not shown in FIG. 1), indicating that the Ethernet device 128 is connected to its Ethernet interface, and that the PLC device 118 is connected to its PLC interface. In response to receiving topology discovery messages from other hybrid devices in the hybrid communication network 100, the hybrid bridge 102 (e.g., the hybrid networking sub-layer) can use any suitable techniques to determine the topology of the hybrid communication network 100. The hybrid bridge 102 (e.g., the hybrid networking sub-layer) can also determine, based on the received topology discovery messages, the preferred transmission route between itself and any other network device (whether legacy device or hybrid device) in the hybrid communication network 100. Likewise, the hybrid bridge 122 (e.g., the hybrid networking sub-layer) can also determine the topology of the hybrid communication network 100 and the preferred transmission route between itself and any other network device. In some embodiments, after the hybrid bridge 102 determines the preferred transmission route between itself and the other network devices, the hybrid bridge 102 can transmit a preferred route message to notify the other hybrid devices 122 of the preferred transmission routes associated with the hybrid bridge 102.

Each hybrid bridge (e.g., the hybrid bridge 102) can selectively populate its local bridge table (e.g., the local bridge table 104) to advertise the addresses of only those network devices for which the hybrid bridge 102 is part of the preferred transmission route. With reference to the example of FIG. 1, the Ethernet devices 114, 116, and 128 may be accessible via both the hybrid bridges 102 and 122. However, based on exchanging the topology discovery messages (and the preferred route messages), the communication unit 112 may determine that the hybrid bridge 102 is part of the preferred transmission route to the Ethernet devices 114 and 116 and that the hybrid bridge 122 is part of the preferred transmission route to the Ethernet device 128. Specifically, the communication unit 112 may determine that the PLC interface 110 is a receive interface on the preferred transmission route to the Ethernet devices 114 and 116. Accordingly, in this specific example shown in FIG. 1, the communication unit 112 can selectively populate the local bridge table 104 to include only the addresses of the Ethernet devices 114 and 116 and to indicate that only the Ethernet devices 114 and 116 are accessible via the PLC interface 110 of the hybrid bridge 102 (e.g., that the Ethernet devices 114 and 116 are directly connected to the hybrid bridge 102). Likewise, the hybrid bridge 122 may determine that its PLC interface is a receive interface on the preferred transmission route to the Ethernet device 128. The communication unit of the hybrid bridge 122 can selectively populate the local bridge table 124 to advertise that only the Ethernet device 128 is accessible via the PLC interface of the hybrid bridge 122. Each hybrid bridge 102 and 122 can then transmit its local bridge table 104 and 124 respectively to other network devices in the hybrid communication network 100. For example, if the hybrid bridge 102 is configured as a PLC-to-Ethernet bridge, the hybrid bridge 102 can transmit the local bridge table 104 (including the list of accessible Ethernet devices) via the PLC interface 110 on the powerline segment 140 of the hybrid communication network 100. Likewise, the hybrid bridge 122 can transmit the local bridge table 124 via its PLC interface on the powerline segment 140 of the hybrid communication network 100.

In addition to the local bridge table, each hybrid bridge (e.g., the hybrid bridge 102) can populate (e.g., based on the received topology discovery messages) a remote bridge table (e.g., the remote bridge table 106) for each PLC interface 110 (e.g., HomePlug AV interface). The remote bridge table 106 can be populated according to the "next hop" PLC interface associated with the preferred transmission route to each destination address (e.g., a media access control (MAC) address of each destination Ethernet device in the hybrid communication network). Thus, with reference to the hybrid bridge 102, the communication unit 112 may determine that the Ethernet device 128 is not reachable through the Ethernet interface 108 of the hybrid bridge 102 via the preferred transmission route or that the PLC interface 110 is a transmit interface on the preferred transmission route to the Ethernet device 128. The communication unit 112 may determine that the PLC interface of the hybrid bridge 122 is a receive interface on the preferred transmission route to the Ethernet device 128. In response, the remote bridge table 106 of the hybrid bridge 102 can be populated with a device identifier (e.g., MAC address) of the Ethernet device 128 and an identifier of the hybrid bridge device 122 (e.g., a terminal equipment identifier (TEI) of the PLC interface of the hybrid bridge 122). Likewise, the hybrid bridge 122 may determine (e.g., based on the received topology discovery messages) that the PLC interface 110 of the hybrid bridge 102 is a receive interface on the preferred transmission route to the Ethernet devices 114 and 116. Accordingly, the hybrid bridge 122 can create two entries in the remote bridge table 126—a first entry that indicates the MAC address of the Ethernet device 114 and the TEI of the PLC interface 110 of the hybrid bridge 102; and a second entry that indicates the MAC address of the Ethernet device 116 and the TEI of the PLC interface 110 of the hybrid bridge 102.

After the hybrid bridges 102 and 122 generate their respective bridge tables, the hybrid bridges 102 and 122 can transmit the local bridge tables 104 and 124 respectively to other network devices of the hybrid communication network 100. Specifically, when the hybrid bridges 102 and 122 are configured as PLC-to-Ethernet bridges, the hybrid bridges 102 and 122 can transmit the local bridge tables 104 and 124 respectively via their respective PLC interfaces onto the powerline network segment 140 of the hybrid communication network 100. As will be further discussed below, the legacy PLC devices (e.g., legacy bridge devices and legacy non-bridge devices) on the powerline network segment 140 can populate their respective remote bridge tables based on the content of the local bridge tables 104 and 124 received from the hybrid bridges 102 and 122 respectively.

At stage B, the PLC device 118 (e.g., a legacy HomePlug AV device, a legacy Ethernet-to-PLC bridge, etc.) receives the local bridge tables 104 and 124 from the hybrid bridges 102 and 122 respectively and populates the remote bridge table 130 based on the received local bridge tables 104 and 124. The PLC device 118 (e.g., the communication unit 120) can identify the network devices (e.g., the MAC addresses of the Ethernet devices) that are reachable/accessible through each of the hybrid devices 102 and 122 from the received local bridge tables 104 and 124. For example, based on the received local bridge tables 104 and 124, the PLC device 118 may determine that the Ethernet devices 114 and 116 are accessible via the PLC interface 110 of the hybrid bridge 102 and that the Ethernet device 128 is accessible via the PLC interface of the hybrid bridge 122. As depicted in FIG. 1, the communication unit 120 of the PLC device 118 can populate the remote bridge table 130 so that any frames intended for the Ethernet devices 114 and 116 are forwarded to the PLC interface 110 of the hybrid bridge 102, and any frame intended for the Ethernet device 128 is forwarded to the PLC interface of the hybrid bridge 122. In some embodiments, the remote bridge table 130 can comprise one or more entries, each of which indicate a relationship between a 48-bit destination Ethernet address (e.g., an Ethernet MAC address) and an 8-bit PLC address (e.g., a terminal equipment identifier (TEI)) of a next hop PLC device. Thus, the remote bridge table 130 of the PLC device 118 can comprise three entries—a first entry that comprises the MAC address of the Ethernet device 116 and the TEI of the PLC interface 110 of the hybrid bridge 102; a second entry that comprises the MAC address of the Ethernet device 116 and the TEI of the PLC interface 110 of the hybrid bridge 102; and a third entry that comprises the MAC address of the Ethernet device 128 and the TEI of the PLC interface of the hybrid bridge 122.

As discussed above in stage A, each of the hybrid bridges 102 and 122 selectively populate their local bridge table based on the preferred transmission routes from their respective PLC interfaces to the Ethernet devices 114, 116, and 128. Because the legacy PLC device 118 uses the local bridge tables 104 and 124 to populate the remote bridge table 130, the hybrid bridges 102 and 122 can indirectly influence the transmission route subsequently selected by the legacy PLC device 118 and can influence the legacy PLC device 118 to transmit a frame via the preferred transmission route, even though the legacy PLC device 118 may be unaware of the existence of preferred transmission routes.

At stage C, the PLC device 118 determines to transmit a frame to the destination Ethernet device 116 and transmits the frame to the hybrid bridge 102 for forwarding to the destination Ethernet device 116 based on the remote bridge table 130. The frame destined for the Ethernet device 116 can comprise an address (e.g., a 48-bit destination MAC address) associated with the Ethernet device 116. To route the frame to the destination Ethernet device 116, the communication unit 120 of the PLC device 118 can access the remote bridge table 130 and can determine an identifier (e.g., the TEI) of a PLC interface of a PLC-to-Ethernet bridge via which to forward the frame. In the example of FIG. 1, the legacy PLC device 118 can determine (from the remote bridge table 130) that the frame destined for the Ethernet device 116 should be transmitted to the PLC interface 110 of the hybrid bridge 102 for forwarding to the Ethernet device 116. The legacy PLC device 118 can determine the address (e.g., an 8-bit TEI) of the PLC interface 110 of the hybrid bridge 102 from the remote bridge table 130 and can transmit the frame to the PLC interface 110 of the hybrid bridge 102.

At stage D, the hybrid bridge 102 forwards the received frame to the destination Ethernet device 116. In some embodiments, a hybrid forwarding layer of the hybrid bridge 102 can use its forwarding tables to determine how to route the frame to the destination Ethernet device 116. In other embodiments, however, the hybrid bridge 102 can use the local bridge table 104 and/or the remote bridge table 106 to determine how to forward the frame to the destination Ethernet device 116. For example, the hybrid bridge 102 (e.g., the PLC interface 110 and/or the communication unit 112) can determine whether the destination Ethernet device 116 is reachable from the hybrid bridge 102 via the preferred transmission route (e.g., whether the destination MAC address of the Ethernet device 116 is listed in the local bridge table 104). If the destination MAC address in the received frame is listed in the local bridge table 104, the hybrid bridge 102 can determine that the corresponding Ethernet device (e.g., the Ethernet device 116) is reachable via the Ethernet interface 108 of the hybrid bridge 102. However, if the destination MAC address (e.g., of the Ethernet device 128) in the received frame is not listed in the local bridge table 104, the hybrid bridge 102 can determine that the frame should be forwarded to the corresponding destination Ethernet device (e.g., the Ethernet device 128) via another hybrid bridge. The hybrid bridge 102 (e.g., the PLC interface 110 and/or the communication unit 112) can identify an entry of the remote bridge table 106 that matches the destination MAC address in the received frame. The identified entry of the remote bridge table 106 may also include a device identifier of another hybrid bridge 122 (e.g., the TEI of the PLC interface of the hybrid bridge 122). The hybrid bridge 102 can then forward the frame to the PLC interface of the hybrid bridge 122 for subsequent forwarding to the Ethernet device 128.

It is noted that, in various embodiments, the local bridge table 104 and the remote bridge table 106 are distinct from the forwarding tables associated with the hybrid networking sub-layer of the hybrid bridge 102. The local bridge table 104 and the remote bridge table 106 may be extensions to the forwarding tables associated with the hybrid networking sub-layer. While the forwarding tables associated with the hybrid networking sub-layer control selection of an entire frame delivery route, the local and the remote bridge tables can control the PLC links (e.g., HomePlug AV links) that are a subset of the complete frame delivery route. The local and the remote bridge tables can be associated with the PLC interfaces and can be used by the PLC interfaces to determine how to forward frames to bridge two distinct communication technologies (e.g., Ethernet and HomePlug AV).

In some embodiments, the hybrid networking sub-layer of the hybrid bridge 102 can populate the local bridge table 104 and the remote bridge table 106 in addition to the forwarding tables associated with the hybrid bridge 102. The hybrid networking sub-layer can provide the local bridge table 104 and the remote bridge table 106 to the PLC interface 110 of the hybrid bridge 102. In another embodiment, the PLC interface 110 of the hybrid bridge 102 can indirectly derive, based on the forwarding tables and the preferred transmission routes (e.g., received from the hybrid networking sub-layer), the local bridge table 104 and the remote bridge table 106. In another embodiment, the PLC interface 110 of the hybrid bridge 102 can directly derive the local bridge table 104 and the remote bridge table 106 from the forwarding tables if the MAC address of a "next hop" communication link is included in the forwarding tables received from the other hybrid devices that generated the forwarding tables.

Although FIG. 1 describes the operations of stages A-D with reference to two bridging-capable hybrid devices 102 and 122, in other embodiments, the hybrid communication network 100 may also comprise non bridging-capable hybrid devices. In other words, the hybrid communication network may comprise at least one hybrid bridge (e.g., the hybrid bridge 102 that supports PLC-to-Ethernet bridging) and a non-bridge hybrid device. The non-bridge hybrid device may comprise, for example, a PLC interface and an Ethernet interface but may not support PLC-to-Ethernet bridging. In this example, the PLC interface of the non-bridge hybrid device may not maintain a local bridge table. The PLC interface of the non-bridge hybrid device may only maintain a remote bridge table. The PLC interface of the non-bridge hybrid device may populate its remote bridge table based, at least in part, on the topology discovery messages received from the other hybrid devices of the hybrid communication network 100. Thus, in response to the non-bridge hybrid device receiving a frame on its PLC interface and intended for a destination Ethernet device, the PLC interface can identify (e.g., based on the remote bridge table) another PLC interface of a hybrid bridge via which to route the frame to the destination Ethernet device. Additionally, the hybrid communication network 100 may comprise bridging-capable legacy devices ("legacy bridges") and/or non-bridge legacy devices. As discussed herein, the legacy bridges and the non-bridge legacy devices can populate their remote bridge tables based on the local bridge tables received from the hybrid bridges of the hybrid communication network.

It is noted that although FIG. 1 is described in the context of PLC (e.g., HomePlug AV)-to-Ethernet bridging, embodiments are not so limited. In other embodiments, the bridging operations described herein can be extended to bridging devices that implement other suitable communication protocols (e.g., for bridging Ethernet devices and MoCA devices, for bridging MoCA devices and HomePlug AV devices, etc.). Although not depicted in FIG. 1, in some embodiments, the Ethernet interfaces of the hybrid devices (and the legacy Ethernet devices) may also be associated with bridging tables that may be populated in accordance with operations described above. Furthermore, it is noted that in some embodiments, the PLC device 118 and the Ethernet devices 114, 116, and 128 may not be legacy devices. For example, the PLC device 118 and the Ethernet devices 114, 116, and 128 may be hybrid devices that do not support the bridging functionality.

Figure 2A:
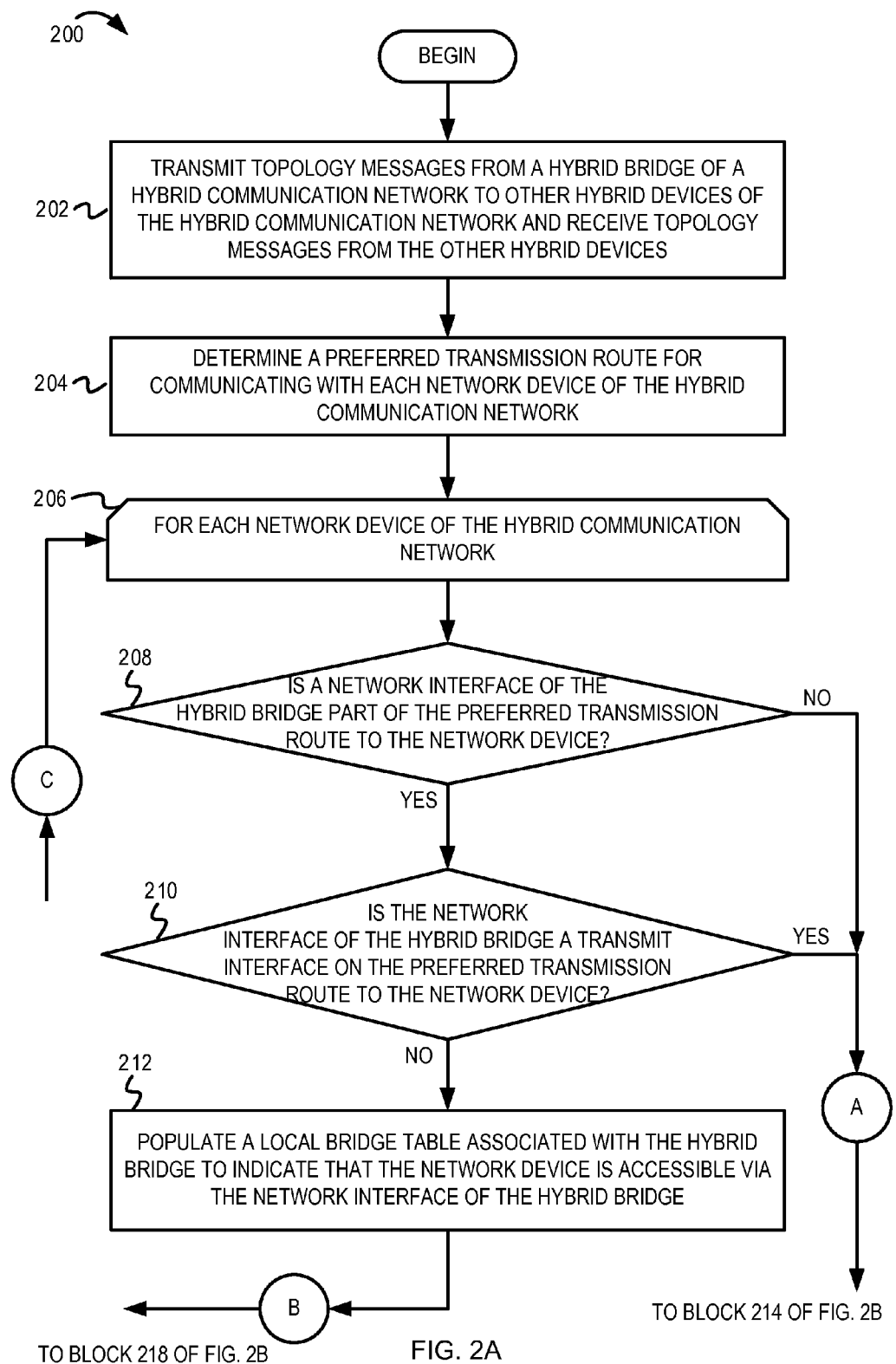
FIGS. 2A and 2B depict a flow diagram illustrating example operations of a hybrid bridge for populating a local bridge table and a remote bridge table.
Figure 2B:
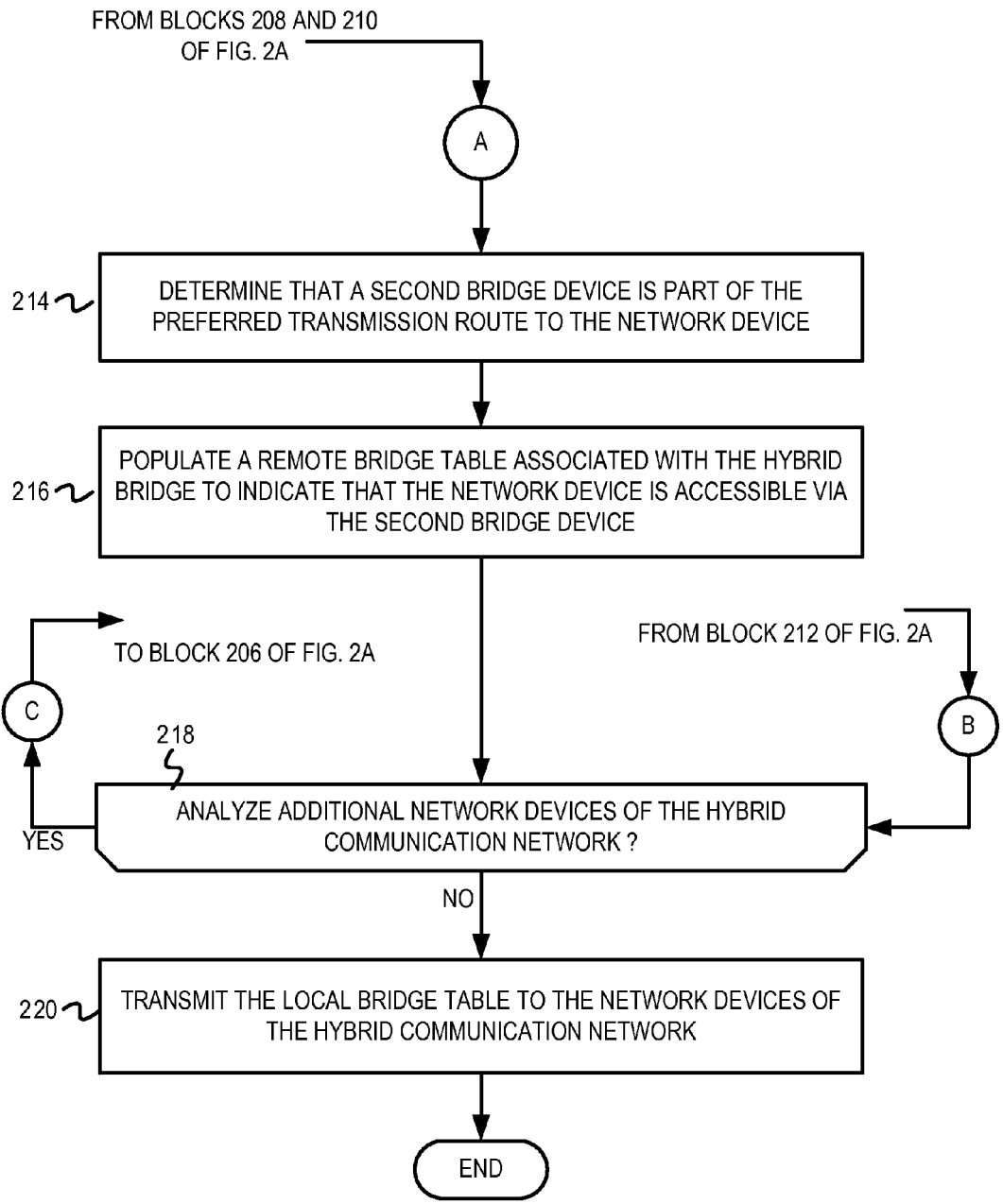

FIGS. 2A and 2B depict a flow diagram ("flow") 200 illustrating example operations of a hybrid bridge for populating a local bridge table and a remote bridge table. The flow 200 begins at block 202.

At block 202, a hybrid bridge of a hybrid communication network transmits topology messages to and receives topology messages from other hybrid devices of the hybrid communication network. With reference to the example of FIG. 1, the hybrid bridge 102 (e.g., the communication unit 112) can broadcast topology messages to the other hybrid devices (e.g., the hybrid bridge 122) in the hybrid communication network 100. The topology messages can comprise information about the hybrid bridge 102 and information about neighbor devices of the hybrid bridge 102. For example, the topology message transmitted by the hybrid bridge 102 can indicate that legacy Ethernet devices 114 and 116 are coupled to the Ethernet interface 108 and that a legacy PLC device 118 is coupled to the PLC interface 110. The topology message can also comprise a list of the network interfaces through which the hybrid bridge 102 supports frame forwarding. In one embodiment, if the PLC interface 110 (e.g., HomePlug AV interface) of the hybrid bridge 102 supports PLC-to-Ethernet bridging, the topology message can include the PLC interface 110 in the list of network interfaces of the hybrid bridge 102 through which frames can be forwarded. The hybrid bridge 102 can indicate that it supports hybrid bridging through the PLC interface 110 by setting one or more predetermined bits in a management message transmitted from the PLC interface 110 (e.g., by setting a bridging station flag (BSF) in a CM_BRG_INFO.CNF management message for a HomePlug AV interface). However, if the PLC interface 110 does not support frame forwarding, the topology message broadcast by the hybrid bridge 102 may not include the PLC interface 110 in the list of network interfaces of the hybrid bridge 102 through which frames can be forwarded. The flow continues at block 204.

At block 204, a preferred transmission route for communicating with each network device of the hybrid communication network is determined. For example, the hybrid bridge 102 (e.g., the communication unit 112) can analyze topology information determined by the hybrid bridge 102 and the topology messages received from other hybrid devices 122 of the hybrid communication network 100. The communication unit 112 can estimate the topology of the hybrid communication network 100 including the location and interconnection of hybrid devices and legacy devices in the hybrid communication network 100, the number and type of network interfaces of the hybrid devices, which (if any) of the network interfaces of the hybrid devices support frame forwarding, etc. In addition, the communication unit 112 can also determine the preferred transmission route for communicating with each network device (whether hybrid devices or legacy devices) in the hybrid communication network 100. In some embodiments, the hybrid bridge 102 can independently determine the preferred transmission route for itself and all the other hybrid devices in the communication network based on information (e.g., path metric information, traffic information, neighbor device information, etc.) received in the topology messages. In other embodiments, the hybrid bridge 102 can determine the preferred transmission route for itself and can receive an indication of the preferred transmission routes associated with the other hybrid devices in a preferred route message received from the other hybrid devices. The flow continues at block 206.

At block 206, a loop begins for each network device of the hybrid communication network. For example, the hybrid bridge 102 (e.g., the hybrid networking sub-layer, the communication unit 112, and/or the PLC interface 110) can execute the operations described below in blocks 208-214 for each network device to determine how to populate the bridge tables 104 and 106 associated with the hybrid bridge 102. In one embodiment when the hybrid bridge 102 is a PLC-to-Ethernet bridge, the hybrid bridge 102 can execute the operations described below in blocks 208-214 for each Ethernet device (e.g., a legacy Ethernet device or a hybrid device with an Ethernet interface) to determine whether to include the MAC address of the Ethernet device in the local bridge table 104 or the remote bridge table 106 of the hybrid bridge 102. The flow continues at block 208.

At block 208, it is determined whether a network interface of the hybrid bridge is part of the preferred transmission route to the network device. For example, if the hybrid bridge 102 is a PLC-to-Ethernet bridge, the communication unit 112 can determine whether the PLC interface 110 (e.g., a HomePlug AV interface) of the hybrid bridge 102 is part of the preferred transmission route for communicating with the network device (e.g., the Ethernet device 116). If the network interface of the hybrid bridge is part of the preferred transmission route for communicating with the network device, the flow continues at block 210. Otherwise, the flow continues at block 214 in FIG. 2B.

At block 210, it is determined whether the network interface of the hybrid bridge is a transmit interface on the preferred transmission route to the network device. The flow 200 moves from block 208 to block 210 if it is determined that the network interface of the hybrid bridge is part of the preferred transmission route to the network device. For example, if it is determined that the PLC interface 110 of the hybrid bridge 102 is on the preferred transmission route to the Ethernet device 114, it may be determined whether the PLC interface 110 will be a transmit interface or a receive interface on the preferred communication route. If the PLC device 118 generates a frame for transmission to the Ethernet device 114, the PLC interface 110 of the hybrid bridge 102 will receive the frame for forwarding to the Ethernet device 114. In other words, in this example, the PLC interface 110 is a receive interface on the preferred transmission route to the Ethernet device 114. As another example, if the Ethernet device 114 generates a frame for transmission to the Ethernet device 128, the PLC interface 110 of the hybrid bridge 102 will transmit the frame (e.g., to the PLC interface of the hybrid bridge 122) for forwarding to the Ethernet device 128. In other words, in this example, the PLC interface 110 is a transmit interface on the preferred transmission route to the Ethernet device 128. At block 210, if it is determined that the network interface is a receive interface on the preferred transmission route to the network device, the flow continues at block 212. Otherwise, if it is determined that the network interface is a transmit interface on the preferred transmission route to the network device, the flow continues at block 214 in FIG. 2B.

At block 212, a local bridge table associated with the hybrid bridge is populated to indicate that the network device is accessible via the network interface of the hybrid bridge. The flow 200 moves from block 210 to block 212 if it is determined that the network interface of the hybrid bridge is a receive interface on the preferred transmission route for communicating with the network device. With reference to the example of FIG. 1, the communication unit 112 may determine that the PLC interface 110 of the hybrid bridge 102 will receive a frame (via the preferred transmission route) for forwarding to the Ethernet devices 114 and 116 (from the Ethernet interface 108 of the hybrid bridge 102). The communication unit 112 can then update/modify the local bridge table 104 associated with the PLC interface 110 to include the addresses (e.g., a 48-bit MAC address) of the Ethernet devices 114 and 116. As another example, it may be determined that the PLC interface of the hybrid bridge 122 will receive a frame (via the preferred transmission route) for forwarding to the Ethernet device 128 (from the Ethernet interface of the hybrid bridge 122). Accordingly, the local bridge table 124 associated with the PLC interface of the hybrid bridge 122 can be updated to include the MAC address of the Ethernet device 128. By populating their respective local bridge tables 104 and 124 to be consistent with their respective receive PLC interfaces that are on the preferred transmission routes, the hybrid devices 102 and 122 can indirectly influence the legacy devices to transmit frames via the preferred transmission routes. If the hybrid networking sub-layer populates the local bridge table 104 of the hybrid bridge 102, the hybrid networking sub-layer can notify the PLC interface 110 of the updates to (and content of) the local bridge table 104. The flow continues at block 218 in FIG. 2B, where a next network device to be analyzed (if any) is identified.

At block 214 in FIG. 2B, it is determined that a second bridge device is part of the preferred transmission route to the network device. The flow 200 moves from block 208 in FIG. 2A to block 214 in FIG. 2B if it is determined that the network interface of the hybrid bridge is not part of the preferred transmission route for communicating with the network device. For example, the communication unit 112 may determine that the PLC interface 110 of the hybrid bridge 102 is not on the preferred transmission route to the Ethernet device 128. In FIG. 2, the flow 200 also moves from block 210 in FIG. 2A to block 214 in FIG. 2B if it is determined that the network interface of the hybrid bridge is a transmit interface on the preferred transmission route to the network device. As discussed above, the communication unit 112 may determine that the PLC interface 110 of the hybrid bridge 102 will transmit the frame (e.g., to the PLC interface of another bridge device) for forwarding to the Ethernet device 128. Although the Ethernet device 128 may be reachable via the Ethernet interface 108 of the hybrid bridge 102, the MAC address of the Ethernet device 128 may not be recorded in the local bridge table 104 if the PLC interface 110 is not part of the preferred transmission route to the Ethernet device 128. Instead, the communication unit 112 can analyze the preferred transmission route for communicating with the Ethernet device 128 and can determine that the PLC interface of a second bridge device (e.g., the hybrid bridge 122) is part of the preferred transmission route to the Ethernet device 128. It is noted that the second bridge device may be a hybrid bridge (as depicted in FIG. 1) or may be a legacy/conventional bridge. The flow continues at block 216.

At block 216, a remote bridge table associated with the hybrid bridge is populated to indicate that the network device is accessible via the second bridge device. For example, as discussed above, the hybrid bridge 102 (e.g., the communication unit 112, the hybrid networking sub-layer, and/or the PLC interface 110) may determine that the PLC interface 110 of the hybrid bridge 102 is not part of the preferred transmission route to the Ethernet device 128 and that the PLC interface of the hybrid bridge 122 is part of the preferred transmission route to the Ethernet device 128. As another example, the hybrid device 102 may determine that the PLC interface 110 of the hybrid bridge 102 is a transmit interface on the preferred transmission route to the Ethernet device 128 and that the PLC interface of the hybrid bridge 122 is a receive interface on the preferred transmission route to the Ethernet device 128. The communication unit 112 can determine an address (e.g., a 48-bit MAC address) of the Ethernet device 128 and an identifier (e.g., an 8-bit TEI) of the PLC interface of the hybrid bridge 122. The communication unit 112 can then create a new entry in the remote bridge table 106 comprising the MAC address of the Ethernet device 128 and the TEI of the PLC interface of the hybrid bridge 122, as depicted in FIG. 1. In some embodiments, as discussed above, the hybrid bridge 102 can populate its remote bridge table 106 based only on knowledge of the preferred transmission routes associated with each of the network devices of the hybrid communication network 100. If the hybrid networking sub-layer populates the remote bridge table 106 of the hybrid bridge 102, the hybrid networking sub-layer can notify the PLC interface 110 of the updates to (and content of) the remote bridge table 106. The flow continues at block 218.

At block 218, it is determined whether additional network devices of the hybrid communication network are to be analyzed. If the hybrid device 102 determines that additional network devices of the hybrid communication network 100 are to be analyzed, the flow loops back to block 206 in FIG. 2A, where the next network device is identified and the operations described above with reference to blocks 208-216 are executed for the next network device. Otherwise, if it is determined that there are no additional network devices to be analyzed, the flow continues at block 220.

At block 220, the local bridge table is transmitted from the hybrid bridge to other network devices of the hybrid communication network. For example, if the hybrid bridge 102 is a PLC-to-Ethernet bridge, the hybrid bridge 102 can transmit the local bridge table 104 on the powerline network segment 140 of the hybrid communication network 100 via the PLC interface 110. For example, if the PLC interface 110 is a HomePlug AV interface, the hybrid bridge 102 can transmit the local bridge table 104 in a CM_BRG_INFO.CNF message via the HomePlug AV interface. In some embodiments, the hybrid bridge 102 can transmit a unicast message comprising the local bridge table 104 to each PLC device in the hybrid communication network 100. In this embodiment, the hybrid bridge 102 can tailor the local bridge table 104 transmitted to each of the PLC devices. In another embodiment, the hybrid bridge 102 can transmit a broadcast message comprising the local bridge table 104 to all the PLC devices in the hybrid communication network 100. Transmitting the local bridge table 104 on the powerline network segment 140 can ensure that other PLC devices (e.g., hybrid devices with a PLC interface, legacy PLC devices, conventional Ethernet-to-PLC bridges, etc.) receive the local bridge table 104 that was populated based on the preferred transmission routes of the hybrid bridge 102. The PLC devices that receive the local bridge table 104 can populate their respective remote bridge tables so that any frames intended for Ethernet devices listed in the received local bridge table 104 are transmitted to the PLC interface 110 of the hybrid bridge 102 for forwarding. From block 220, the flow ends.

Figure 3:
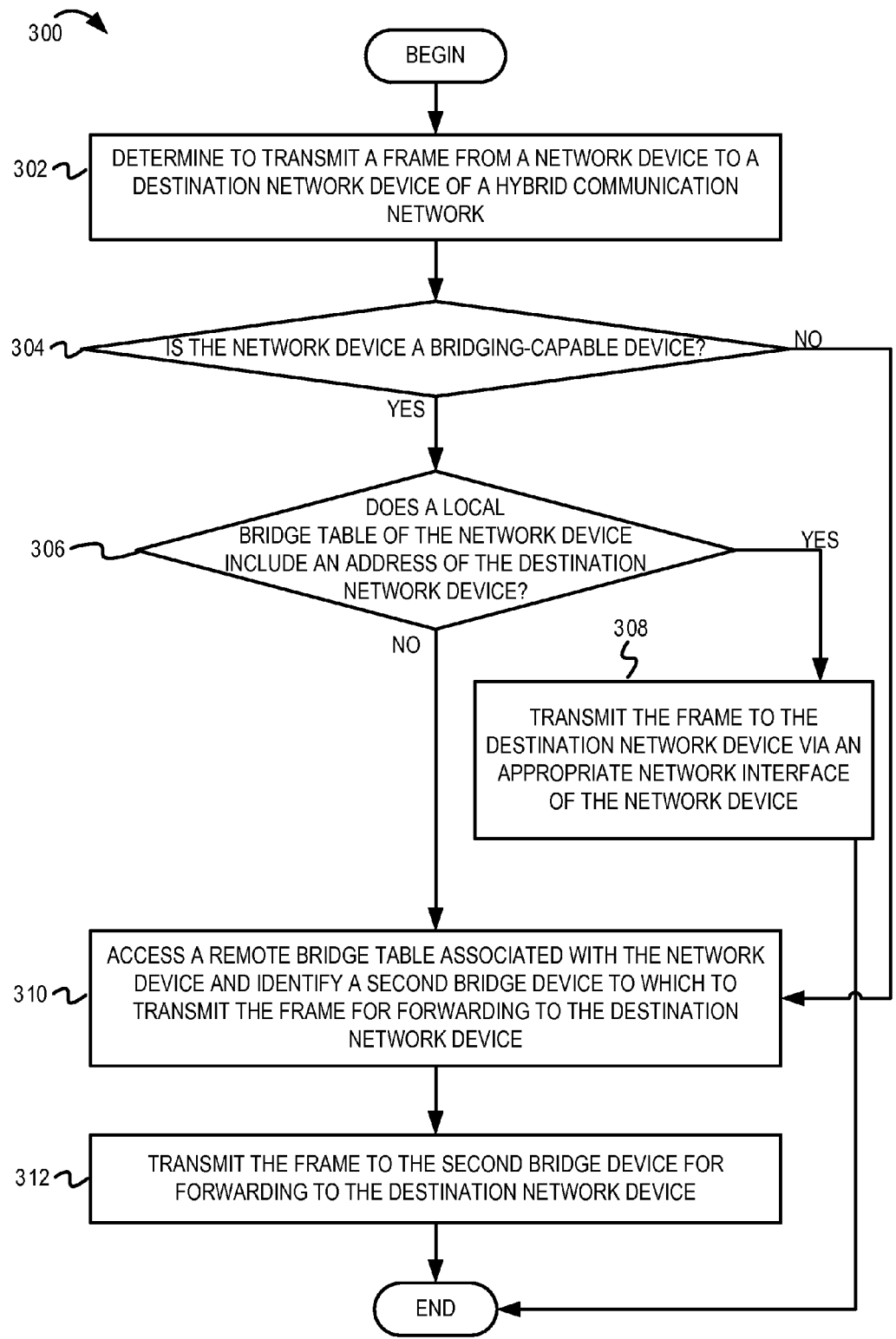
FIG. 3 is a flow diagram illustrating example operations for using the bridge tables to route a frame to a destination network device.

FIG. 3 is a flow diagram 300 illustrating example operations for using the bridge tables to route a frame to a destination network device. The flow 300 begins at block 302.

At block 302, a network device of a hybrid communication network determines to transmit a frame to a destination network device of the hybrid communication network. In some embodiments, the network device may source the frame that is scheduled for transmission to the destination network device. With reference to the example of FIG. 1, the legacy PLC device 118 may generate a frame for transmission to the destination Ethernet device 116. In other embodiments, the network device may receive the frame (from another network device) for forwarding to the destination network device. With reference to the example of FIG. 1, the hybrid bridge 102 may receive the frame at its PLC interface 110 for forwarding to the destination Ethernet device 116. The flow continues at block 304.

At block 304, it is determined whether the network device is a bridging-capable device. Typically, only bridging-capable devices (e.g., either legacy bridges or hybrid bridges) that support frame forwarding may comprise a local bridge table. As discussed above, if the hybrid device 102 is configured as a PLC-to-Ethernet bridge, the local bridge table 104 of the PLC interface 110 of the hybrid bridge 102 can comprise the addresses of those Ethernet devices 114 and 116 that are reachable from the PLC interface 110 via a preferred transmission route. Thus, it may be determined whether the PLC interface 110 supports bridging or frame forwarding. If it is determined that the network device is a bridging-capable device, the flow continues at block 306. Otherwise, the flow continues at block 310.

At block 306, it is determined whether the local bridge table of the network device includes an address of the destination network device. The flow 300 moves from block 304 to block 306 in response to determining that the network device is a bridging-capable device. With reference to the example of FIG. 1, the PLC interface 110 of the hybrid bridge 102 may receive a frame for forwarding to the destination Ethernet device 116. The PLC interface 110 (or in some embodiments, the hybrid networking sub-layer) can read the MAC address of the destination Ethernet device 116 from the received frame and can determine whether the local bridge table 104 (associated with the PLC interface 110) comprises the MAC address of the destination Ethernet device 116. If it is determined that the local bridge table comprises the address of the destination network device, the flow continues at block 308. Otherwise, the flow continues at block 310.

At block 308, the frame is transmitted to the destination network device via an appropriate network interface of the first network device. The flow 300 moves from block 306 to block 308 if it is determined that the network device is a hybrid bridge and that the local bridge table includes the address of the destination network device. With reference to the example of FIG. 1, if the hybrid bridge 102 is a PLC-to-Ethernet bridge, the PLC interface 110 of the hybrid bridge 102 may receive a frame intended for the destination Ethernet device 116. The PLC interface 110 can determine that its local bridge table 104 comprises the MAC address of the destination Ethernet device 116. The hybrid bridge 102 can then forward the frame to the destination Ethernet device 116 via the Ethernet interface 108 of the hybrid bridge 102. From block 308, the flow ends.

At block 310, a remote bridge table associated with the network device is accessed to identify a second bridge device to which to transmit the frame for forwarding to the destination network device. The flow 300 moves from block 306 to block 310 if the local bridge table of the hybrid bridge does not include the address of the destination network device. With reference to the example of FIG. 1, the PLC interface 110 of the hybrid bridge 102 may receive a frame intended for the destination Ethernet device 128. The PLC interface 110 may determine that its local bridge table 104 does not comprise the MAC address of the destination Ethernet device 128. The PLC interface 110 (or in some embodiments, the hybrid networking sub-layer) can then determine whether the remote bridge table 106 (associated with the PLC interface 110) comprises an entry that matches the MAC address of the destination Ethernet device 128. In FIG. 1, the PLC interface 110 (or the communication unit 112) can search the remote bridge table 106 and can identify an entry in the remote bridge table that matches the MAC address (or another suitable address) of the destination Ethernet device 128. The PLC interface 110 (or the communication unit 112) can determine the TEI (or another suitable address) of the PLC interface of the hybrid bridge 122 that corresponds to the destination MAC address in the remote bridge table 106.

With reference to FIG. 3, the flow 300 also moves from block 304 to block 310 if it is determined that the network device is not a hybrid bridge. For example, the legacy PLC device 118 can determine to transmit a frame to the destination Ethernet device 116. As similarly discussed above, the legacy PLC device 118 (e.g., the communication unit 120) can access the remote bridge table 130 and can identify an entry in the remote bridge table 130 that matches the address (e.g., a MAC address) of the destination Ethernet device 116. The legacy PLC device 118 can determine that the destination Ethernet device 116 is reachable from the PLC interface 110 of the hybrid bridge 102. The legacy PLC device 118 can also determine the identifier (e.g., the TEI) of the PLC interface 110 of the hybrid bridge 102 from the remote bridge table 130. The flow continues at block 312.

At block 312, the frame is transmitted to the second bridge device for forwarding to the destination network device. For example, the PLC device 118 can determine that the Ethernet device 116 is accessible via the PLC interface 110 of the hybrid bridge 102 and can determine the identifier (e.g., the TEI) associated with the PLC interface 110 of the hybrid bridge 102. The PLC device 118 can then insert the identifier of the PLC interface 110 and the address (e.g., MAC address) of the destination Ethernet device 116 in the frame. The PLC device 118 can transmit the frame to the PLC interface 110 of the hybrid bridge 102 for forwarding to the destination Ethernet device 116. As another example, the PLC interface 110 of the hybrid bridge 102 may determine (based on the remote bridge table 106) that the Ethernet device 128 is accessible via the PLC interface of the hybrid bridge 122. Accordingly, the PLC interface 110 can transmit the frame to the PLC interface of the hybrid bridge 122 for forwarding to the Ethernet device 128. From block 312, the flow ends.

It should be understood that FIGS. 1-3 and the operations described herein are examples meant to aid in understanding embodiments and should not be used to limit embodiments or limit scope of the claims. Embodiments may perform additional operations, fewer operations, operations in a different order, operations in parallel, and some operations differently. For example, FIG. 1 depicts the PLC device 118 receiving the local bridge tables 104 and 124, and using the received local bridge tables 104 and 124 to populate the remote bridge table 130 associated with the legacy PLC device 118. In some embodiments, the hybrid devices (e.g., the hybrid networking sub-layer of each of the hybrid devices) in the hybrid communication network 100 may populate their respective remote bridge tables based on the received topology discovery messages, knowledge of the preferred transmission routes, and knowledge of the topology of the hybrid communication network 100. However, in some embodiments, the hybrid devices may populate their respective remote bridge tables based on the local bridge tables received from other hybrid devices of the hybrid communication network 100.

It is noted that in some embodiments, the preferred transmission route between any two network devices (e.g., a PLC device 118 and an Ethernet device 114) may vary depending on the frame classification information (e.g., frame stream, the frame type, priority level, source address, and other such factors). For example, the hybrid bridge 102 may be part of (e.g., the PLC interface 110 of the hybrid bridge 102 may be a receive interface on) the preferred transmission route to the Ethernet device 116 for a first frame stream; while the hybrid bridge 122 may be part of (e.g., the PLC interface of the hybrid bridge 122 may be a receive interface on) the preferred transmission route to the same Ethernet device 116 for a second frame stream. In this embodiment, the local bridge tables 104 and 124 transmitted by the hybrid devices 102 and 122 respectively can also comprise information about the frame classification information. In some embodiments, the local bridge tables 104 and 124 (and consequently the remote bridge tables 106, 126, and 130) may be populated to take into account different frame streams, frame types, etc. that may be transmitted. For example, the local bridge table 104 can include the MAC address of the Ethernet device 116 and an indication of the first frame stream; while the local bridge table 124 can include the MAC address of the Ethernet device 116 and an indication of the second frame stream. The PLC device 118 can populate its remote bridge table 120 so that the PLC device 118 transmits a frame belonging to the first frame stream intended for the Ethernet device 116 to the PLC interface 110 of the hybrid bridge 102 and transmits a frame belonging to the second frame stream intended for the Ethernet device 116 to the PLC interface of the hybrid bridge 122.

Although FIG. 1 depicts the legacy PLC device 118 accessing its remote bridge table 130 to determine how to route a frame to the destination Ethernet device 116, in some embodiments, the PLC interface 110 of the hybrid bridge 102 may determine to transmit the frame to a destination Ethernet device. In this embodiment, the PLC interface 110 of the hybrid bridge 102 can first check the local bridge table 104 (associated with the PLC interface 110) to determine whether the destination Ethernet device (e.g., the Ethernet device 116) is directly reachable from the Ethernet interface 108 of the hybrid bridge 102 via a preferred transmission route. If so, the frame can be directly transmitted to the destination Ethernet device 116 via the Ethernet interface 108 of the hybrid bridge 102. However, if the destination Ethernet device (e.g., the Ethernet device 128) is not listed in the local bridge table 104, then the Ethernet device 128 is not reachable from the Ethernet interface 108 of the hybrid bridge 102 via the preferred transmission route. Accordingly, the PLC interface 110 can access the remote bridge table 106 (associated with the PLC interface 110) and can identify a device identifier (e.g., a TEI) of the PLC interface of another hybrid bridge 122 via which the destination Ethernet device 128 can be accessed via the preferred transmission route, as described above in stages C and D of FIG. 1.

In some embodiments as discussed above, the hybrid bridge 122 may not be part of the preferred transmission route to an Ethernet device 116 even though the Ethernet device 116 may be coupled with the hybrid bridge 122. For example, the Ethernet device 116 may be connected to both the hybrid bridges 102 and 122. The PLC interface 110 of the hybrid bridge 102 may a receive interface on the preferred transmission route to the Ethernet device 116 while the PLC interface of the hybrid bridge 122 may not be part of (or may be a transmit interface on) the preferred transmission route to the Ethernet device 116. In this embodiment, even if the PLC interface of the hybrid bridge 122 receives a frame intended for the Ethernet device 116, the hybrid bridge 122 may not directly transmit the frame to the Ethernet device 116. Instead, the hybrid device 122 may provide the frame to the PLC interface 110 of the hybrid bridge 102 (e.g., via the powerline network segment) and the hybrid bridge 102 may forward the frame to the Ethernet device 116 via the preferred transmission route.

Although not depicted in FIGS. 1 and 3, it is noted that in some embodiments, the remote bridge table 130 of the PLC device 118 may not comprise an entry that matches the address of the destination Ethernet device 116. In this embodiment, the PLC device 118 can broadcast the frame on the powerline network segment using a broadcast destination identifier (e.g., a broadcast TEI). The hybrid bridges 102 and 122 may receive the broadcast frame at their respective PLC interfaces. The hybrid bridges 102 and 122 can access their respective bridge tables to determine how to route the frame to the destination Ethernet device. If the local bridge table or the remote bridge table associated with one of the hybrid devices 102 and 122 comprises the address of the destination Ethernet device 116, the hybrid bridge can forward the frame to the destination Ethernet device 116 via an appropriate network interface. However, if the local bridge tables and the remote bridge tables associated with the hybrid bridges 102 and 122 do not comprise an entry that matches the address of the destination Ethernet device 116, the hybrid devices 102 and 122 can re-broadcast the received frame via their respective Ethernet interfaces. It is also noted that broadcast frames and multicast frames received at the PLC interface 110 of the hybrid bridge 102 can be re-broadcast on the Ethernet segment via the Ethernet interface 108. Furthermore, broadcast frames and multicast frames received at the Ethernet interface 108 of the hybrid bridge 102 can be re-broadcast on the powerline network segment via the PLC interface 110.

In some embodiments, the hybrid bridge 102 may only receive those frames through its PLC (e.g., HomePlug AV) interface 110 where the MAC destination address indicated in the received frame matches the MAC address of the PLC interface 110. In this embodiment, the hybrid bridge 102 (and the PLC interface 110) may not present itself to the powerline network segment as a PLC-to-Ethernet bridge. The hybrid bridge 102 may indicate that it does not support PLC-to-Ethernet bridging by setting one or more bits in a management message (e.g., by not setting the BSF) and may not generate or transmit its local bridge table(s) to other PLC devices. Alternately, in this embodiment, the hybrid bridge 102 can present itself to the powerline network segment as a PLC-to-Ethernet bridge, can indicate that it supports PLC-to-Ethernet bridging, and can generate and transmit the local bridge table comprising the MAC address of the PLC interface of the hybrid bridge 102.

In accordance with the powerline communication protocol (e.g., HomePlug AV protocol), an 8-bit terminal equipment identifier (TEI) can be dynamically assigned to each PLC device (e.g., the PLC device 118, the PLC interface 110 of the hybrid bridge 102, etc.) in the local powerline network segment. A transmitter PLC device can use the TEI of a receiver PLC device to transmit a frame to the receiver PLC device and the receiver PLC device can accept/discard a frame depending on the TEI indicated in the received frame. In some embodiments, the TEI may be unique to the PLC device only within the powerline network segment within the hybrid communication network 100. In addition, each of the PLC devices (e.g., the hybrid devices or the legacy PLC devices) can also have a universal identifier (e.g., a 48-bit address) that is unique across all types of networks, communication technologies, and devices. In some embodiments, when the upper protocol layers (e.g., the network layer, the transport layer, or the application layer in an open systems interconnection (OSI) model) of the hybrid bridge 122 generate a frame, the frame can comprise the 48-bit address of the destination Ethernet device 114. The PLC interface (e.g., the HomePlug AV interface) of the PLC device 118 can identify the TEI of the PLC interface 110 of the hybrid bridge from the remote bridge table 130, can encapsulate the frame in a PLC header that includes the TEI of the PLC interface 110, and can transmit the frame to the PLC interface 110 on the powerline network.

It is also noted that in some embodiments, the local bridge tables (e.g., the LBDAT) and the remote bridge tables (e.g., the RBAT) are associated with PLC interfaces (e.g., HomePlug AV interfaces) and MoCA interfaces. In one example, if a hybrid bridge comprises a HomePlug AV interface, a MoCA interface, and an Ethernet interface, the hybrid bridge can comprise two local bridge tables and two remote bridge tables—one each for the HomePlug AV interface and the MoCA interface respectively.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
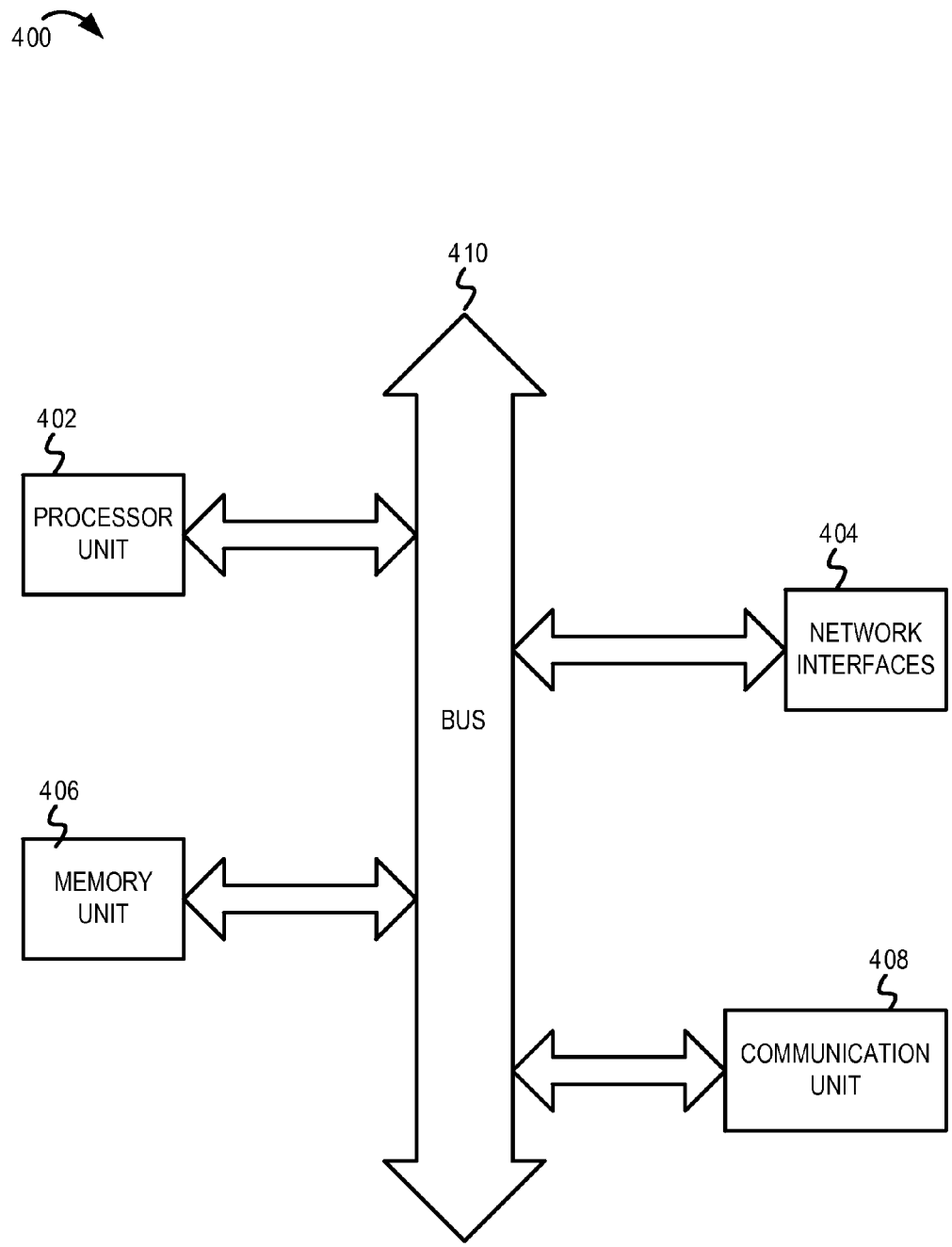
FIG. 4 is a block diagram of one embodiment of an electronic device including a mechanism for bridging network devices in a hybrid communication network.

FIG. 4 is a block diagram of one embodiment of an electronic device 400 including a mechanism for bridging network devices in a hybrid communication network. In some embodiments, the electronic device 400 can be a laptop computer, a tablet computer, a netbook, a mobile phone, a smart appliance, a gaming console, a desktop computer, or other suitable electronic device comprising communication capabilities. The electronic device 400 includes a processor unit 402 (possibly including multiple processors, multiple cores, multiple nodes, and/or implementing multi-threading, etc.). The electronic device 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The electronic device 400 also includes a bus 410 (e.g., PCI, ISA, PCI-Express, HyperTransport®, InfiniBand®, NuBus, AHB, AXI, etc.), and network interfaces 404 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 400 also includes a communication unit 408. The communication unit 408 can execute functionality described above with reference to FIGS. 1-3 to selectively populate the local bridge table and the remote bridge table based on whether the electronic device 400 is part of the preferred transmission route for communicating with other network devices. The communication unit 408 can transmit the local bridge table to influence legacy network devices to populate their respective remote bridge tables and to transmit frames based on the preferred transmission routes. Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). For example, the communication unit 408 may comprise one or more additional processors that are distinct from the processor unit 402 coupled with the bus 410. The processor unit 402, the memory unit 406, and the network interfaces 404 are coupled to the bus 410. Although illustrated as being coupled to the bus 410, the memory unit 406 may be coupled to the processor unit 402.

While the embodiments are described with reference to various implementations and exploitations, it will be understood that these embodiments are illustrative and that the scope of the inventive subject matter is not limited to them. In general, techniques for bridging network devices in a hybrid communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for bridging network devices in a communication network that uses different networking technologies, the method comprising:

selecting a first transmission route from a plurality of transmission routes to a network device of the communication network based, at least in part, on a received topology discovery message;

determining whether a first network interface of a hybrid bridge device is a receive interface in the first transmission route, wherein the first network interface is one of a plurality of network interfaces of the hybrid bridge device that support different networking technologies; and associating, in a local bridge table of the hybrid bridge device, an identifier of the network devices with an identifier of the first network interface, in response to determining that the first network interface is a receive interface in the first transmission route.

2. The method of claim 1, further comprising:

in response to determining that the first network interface is a transmit interface in the first transmission route, determining whether a network bridge device of the communication network is in the first transmission route; and associating, in a remote bridge table of the hybrid bridge device, the identifier of the network device with an identifier of the network bridge device.

3. The method of claim 1, wherein associating in the local bridge table comprises:

populating the local bridge table with the identifier of the network device and with frame classification information associated with frames that are scheduled to be transmitted from the first network interface to the network device.

4. The method of claim 3, wherein the frame classification information comprises at least one member of a group consisting of a frame stream, a frame type, a frame priority level, and a source address.

5. The method of claim 1, further comprising
associating, in a remote bridge table of the hybrid bridge device, the identifier of the network device with an identifier of a network bridge device, in response to determining that the hybrid bridge device is not in the first transmission route and determining that the network bridge device is in the first transmission route.

6. The method of claim 5, wherein,
the identifier of the network bridge device is an address of a first network interface of the network bridge device, wherein the hybrid bridge device is coupled with the first network interface of the network bridge device.

7. The method of claim 5, wherein the identifier of the first of the network device is a media access control (MAC) address and the identifier of the network bridge device is a terminal equipment identifier (TEI).

8. The method of claim 1, further comprising:
determining to transmit a frame to the network device;
determining whether the local bridge table includes the identifier of the network device;
in response to determining that the local bridge table does not include the identifier of the network device, determining whether a remote bridge table of the hybrid bridge device includes an association between the network devices and a network bridge device;
transmitting the frame to the network bridge device from a second network interface of the plurality of network interfaces for forwarding to the network device, in response to determining that the remote bridge table includes the association between the network device and the network bridge device; and
broadcasting the frame from the first network interface, in response to determining that the remote bridge table does not include the association between the network device and the network bridge device.

9. The method of claim 1, wherein the hybrid bridge device is a powerline communication (PLC)-to-Ethernet bridge device, the method further comprising:
determining to transmit a frame to the network device in response to receiving the frame at a PLC interface of the hybrid bridge device for transmission to an Ethernet device of the communication network.

10. The method of claim 1, wherein, selecting the first transmission route is based, at least in part, on at least one member of a group consisting of path metric information, traffic information, and neighbor device information.

11. The method of claim 1, further comprising transmitting the local bridge table to another hybrid bridge device of the communication network.

12. The method of claim 1, further comprising:
transmitting a topology discovery message associated with the hybrid bridge device, wherein the transmitted topology discovery message includes,
an indication of frame forwarding support for the first network interface and a second network interface of the plurality of interfaces; and
the first transmission route.

13. One or more non-transitory machine-readable media having instructions stored therein, the instructions to:
select a first transmission route from a plurality of transmission routes to a network device of a communication network based, at least in part, on a received topology discovery message;
determine whether a first network interface of a hybrid bridge device is a receive interface in the transmission route, wherein the first network interface is one of a plurality of network interfaces of the hybrid bridge device that supports different networking technologies; and
associate, in a local bridge table of the hybrid bridge device, an identifier of the network device with an identifier of the first network interface, in response to determining that the first network interface is a receive interface in the first transmission route.

14. The non-transitory machine-readable media of claim 13, wherein the instructions further comprise instructions to:
in response, at least in part, to determining that the first network interface is a transmit interface in the first transmission route,
determine whether a network bridge device of the communication network is in the first transmission route; and
associate, in a remote bridge table of the hybrid bridge device, the identifier of the network device with an identifier of the network bridge device.

15. The non-transitory machine-readable media of claim 13, wherein the instructions to associate in the local bridge table comprise instructions to:
populate the local bridge table with the identifier of the network device and with frame classification information associated with frames that are scheduled to be transmitted from the first network interface to the network device.

16. The non-transitory machine-readable media of claim 13, wherein the instructions further comprise instructions to:
in response to determining that the hybrid bridge device is not in the first transmission route and that a network bridge device of the communication network is in the first transmission route associate, in a remote bridge table of the hybrid bridge device, the identifier of the network device with an identifier of the network bridge device.

17. The non-transitory machine-readable media of claim 13, wherein the instructions further comprise instructions to:
determine to transmit a frame to the network device;
determine whether the local bridge table includes the identifier of the network device;
in response to determining that the local bridge table does not include the identifier of the network device, determining whether a remote bridge table of the hybrid bridge device—includes an association between the network device and a network bridge device of the communication network;
transmit the frame to the network bridge device from a second network interface of the hybrid bridge device for forwarding to the network devices, in response to determining that a remote bridge table of the hybrid bridge device includes the association of the network device and the network bridge device; and
broadcast the frame from the first network interface, in response to determining that the remote bridge table does not include the association of the network device and the network bridge device.

18. A hybrid bridge device comprising:
a processor;
a plurality of network interfaces that support at least two different networking technologies; and
a machine readable medium having instructions stored therein, the instructions executable by the processor to cause the hybrid bridge device to:
select a first transmission route from a plurality of transmission routes to a network device within a communication network based, at least in part, on a received topology discovery message;

determine whether a first network interface of the plurality of network interfaces is part of the transmission route;

in response to determining that the first network interface is part of the first transmission route, determine whether the first network interface is a transmit interface or a receive interface in the first transmission route; and in response to determining that the first network interface is a receive interface in the first transmission route, associate, in a local bridge table of the hybrid bridge device, an identifier of the first network interface with an identifier of the network device.

19. The hybrid bridge device of claim 18, wherein the instructions further comprise instructions executable by the processor to cause the hybrid bridge device to:

in response to determining that the first network interface is a transmit interface in the first transmission route,
determine whether a network bridge device of the communication network is in the first transmission route; and
associate, in a remote bridge table of the hybrid bridge device, the identifier of the network device with an identifier of the network bridge device, in response to determining that the network bridge device is in the first transmission route.

20. The hybrid bridge device of claim 18, wherein the instructions further comprise instructions executable by the processor to cause the hybrid bridge device to:

associate, in a remote bridge table of the hybrid bridge device, the identifier of the network device with an identifier of a network bridge device, in response to determining that the hybrid bridge device is not in the first transmission route and that the network bridge device is in the first transmission route.

21. The hybrid bridge device of claim 18, wherein the instructions further comprise instructions executable by the processor to cause the hybrid bridge device to:

determine to transmit a frame to the network device;

determine whether the local bridge table includes the identifier of the network device;

in response to determining that the local bridge table does not include the identifier of the network device,
determine whether a remote bridge table of the hybrid bridge device includes an association between the network device and a network bridge device;
transmit the frame to the network bridge device from a second network interface of the plurality of network interfaces for forwarding to the network device, in response to determining that the remote bridge table includes the association of the network device and the network bridge device; and broadcast the frame from the first network interface, in response to determining that the remote bridge table does not include the association of the network device and the network bridge device.

* * * * *